Patented June 6, 1944

2,350,385

UNITED STATES PATENT OFFICE 2,350,385

CYCLIZED RUBBER CONTAINING BASIC AMINO POLYMERS

William Hale Charch, Buffalo, N. Y., assignor to E. I. du Pont de Nemours & Company, Wilmington, Del., a corporation of Delaware No Drawing. Application August 23, 1941, Serial No. 408,069

15 Claims. (Cl. 260—734)

This invention relates to condensation derivatives of rubber, especially to a means of prolonging their utility. More particularly, it appertains to the incorporation of amino polymers in cyclized rubber, and its compositions, to extend their serviceableness.

A resin known as cyclized rubber is obtained when a very high grade of low protein content rubber is made into a heavy viscous, non-drying cement with benzene, and refluxed with a catalyst such as stannic chloride. It appears to have the formula:

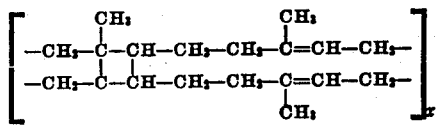

$x$ being a large whole number somewhat smaller than the number of isoprene units in rubber. Minor variations in certain properties (distortion point, solution viscosity) of the cyclized rubber, obtained by varying the time of reaction, result in a family of resins.

Cyclized rubber is of interest in many fields, for example, as a cementing agent in coating compositions, as the principal component of adhesive compositions, etc. Adhesive bonds depending principally upon cyclized rubber (cyclized rubber alone or in combination with conventional adhesive materials) are initially very good, but they weaken rapidly, indicating that this material suffers some deleterious (presumably molecular) change with age. Cyclized rubber discolors, particularly when subjected to sunlight and/or heat. These drawbacks, inter alia, have retarded the commercial use of this material.

Originally it was assumed that the changes in properties of the cyclized rubber and compositions based thereon resulted from an oxidizing action, particularly under conditions involving light and heat, and efforts were made to maintain such products in their initial condition by incorporating anti-oxidants therein. The slight extent of the improvement (in those cases where improvement could be detected) obtained by this scheme was discouraging. The time elapsing before loss of heat sealing properties increased less than five-fold. The results so far as discoloration was concerned were equally disappointing. Other undesirable features attendant upon these efforts were difficulties in the application of the compositions, objectionable lowering of the softening point of adhesive compositions, inability of the compounded material to withstand shock, etc.

It was, therefore, an object of this invention to stabilize cyclized rubber and compositions comprising the same. Other objects were to increase the utility and lengthen the useful life of cyclized rubber and its compositions, the preparation of heat, age and oxidation-resistant adhesives and transparent coating compositions, and the manufacture of adhesives having outstanding power to adhere plain and moistureproofed regenerated cellulose, plain and wax impregnated paper, and like materials. A general advance in the art, and other objects which will appear hereinafter, are also contemplated.

It has now been found that color formation in cyclized rubber can be restrained (avoided, eliminated, prevented, inhibited, curbed, repressed, obviated) and such products and compositions containing the same stabilized and their useful life very greatly lengthened, by diluting (compounding with, incorporating therein) them with certain amino polymers. The polymeric amino substances are mostly synthetic resins derived from ammonia and/or monomeric amino-hydrogen-containing bodies which are capable of being formed into coherent (self-sustaining) films, and which are substantially insoluble in water and soluble in 2% aqueous acetic acid and organic solvents. They are, with few exceptions, substantially insoluble in 5% aqueous ammonia or sodium hydroxide. The amino nitrogen may be primary, secondary or tertiary, and may be part of an open chain or of a cyclic molecular structure.

Comparative heat seal strengths appear to be the most satisfactory way of showing the effectiveness (stabilizing effect) of the amino polymers. A standard heat seal strength test (U. S. A. Patent No. 2,147,180 to Ubben) was used to secure that data in the following tables of representative results.

Table I

| Per cent | Stabilizers and antioxidants | Heat seal strength | | | |
|---|---|---|---|---|---|
| | | Original | 7 days | 14 days | 21 days |
| | None (control) | 700 | 10 | 10 | 10 |
| 1 | Dimethyl amino ethyl methacrylate polymer. | 700 | 700 | 300 | 110 |
| 2 | do | 700 | 500 | 400 | 200 |
| 3 | do | 700 | 500 | 500 | 200 |

The compositions tested consisted of 10 parts paraffin wax, 90 parts cyclized rubber [1] and addition material (the percent of which, based on the amount of paraffin wax plus cyclized rubber, is set out in the tabulation). The heat sealed regenerated cellulose test strips were aged at 95° F. (35° C.) for the time set out in the tabulation at the tops of the columns of heat seal strengths.

[1] The cyclized rubber used was the non-homogeneous material obtained by drowning the reaction mass before the initial exothermic preparation reaction had subsided. It had a deformation point of 30° C.

Table II

| Per cent | Stabilizer | Heat seal strength | | | | | | |
|---|---|---|---|---|---|---|---|---|
| | | Original | Days of aging | | | | | |
| | | | 7 | 14 | 21 | 28 | 35 | 42 |
| | None (control) | 200 | 50 | 20 | 15 | 10 | 10 | 10 |
| 2 | Dimethyl amino ethyl methacrylate monomer [a] | 200 | 65 | 20 | 10 | 10 | 10 | 10 |
| 5 | ...do.[a] | 200 | 95 | 30 | 10 | 10 | 10 | 10 |
| 2 | Dimethyl amino ethyl methacrylate polymer | 200 | 180 | 180 | 180 | 180 | 150 | 140 |
| 3 | ...do... | 200 | 200 | 180 | 180 | 180 | | |
| 5 | ...do... | 200 | 200 | 200 | 200 | 200 | 200 | 200 |
| 3 | Diethyl amino ethyl methacrylate polymer | 200 | 180 | 140 | 140 | | | 75 |
| 5 | ...do | 200 | 200 | 200 | 200 | 190 | 170 | 140 |
| 3 | Dicyclohexyl amino ethyl methacrylate polymer | 200 | 200 | 200 | 170 | 100 | 100 | 70 |
| 2 | Phenol-formaldehyde-methyl-amine resin | 200 | 170 | 140 | 140 | 140 | 140 | 130 |
| 3 | ...do | 200 | 170 | 170 | 160 | 160 | 160 | 165 |
| 5 | ...do | 200 | 200 | 200 | 200 | 200 | | |
| 2 | Diphenyl guanidine-formaldehyde resin | 200 | 170 | 170 | 170 | 170 | 170 | 165 |
| 2 | Phenol-formaldehyde-piperazine resin | 200 | 175 | 160 | 160 | 150 | 150 | |
| 3 | ...do | 200 | 185 | 185 | 180 | 180 | 180 | |
| 5 | ...do | 200 | 195 | 190 | 190 | 190 | 190 | |
| 3 | Triethanolamine phthalate resin | 200 | 165 | 165 | 155 | 155 | 140 | 135 |

[a] The effect of the monomeric amino bodies is included for purposes of comparison.

The compositions tested consisted of 10 parts paraffin wax, 90 parts cyclized rubber[3] and the addition materials set out in the tabulation. The heat sealed regenerated cellulose test strips were aged at 95° F. (35° C.) for the time indicated.

Table III

| Per cent | Stabilizer | Hours of aging | | | | | |
|---|---|---|---|---|---|---|---|
| | | Original | Sun lamp hours | | | | |
| | | | 4 | 8 | 12 | 16 | 20 |
| | None (control) | 200 | 15 | 10 | | | |
| 5 | Dimethyl amino ethyl methacrylate monomer [a] | 200 | 15 | 10 | | | |
| 2 | Dimethyl amino ethyl methacrylate polymer | 200 | 145 | 110 | 100 | 60 | 35 |
| 3 | ...do... | 200 | 145 | 130 | 130 | 75 | 50 |
| 5 | ...do... | 200 | 190 | 185 | 175 | 105 | 60 |
| 3 | Diethyl amino ethyl methacrylate polymer | 200 | 130 | 35 | 10 | | |
| 2 | Phenol-formaldehyde-methylamine resin | 200 | 130 | 125 | 65 | 50 | 15 |
| 3 | ...do | 200 | 140 | 140 | 80 | 70 | 15 |
| 5 | ...do | 200 | 135 | 135 | 80 | 85 | 15 |
| 2 | Diphenyl guanidine-formaldehyde resin | 200 | 100 | 100 | 70 | 65 | |
| 3 | ...do | 200 | 125 | 105 | 80 | 60 | 60 |
| 5 | ...do | 200 | 160 | 120 | 120 | 65 | 65 |
| 3 | Phenol-formaldehyde-piperazine resin | 200 | 145 | 100 | | 15 | 15 |
| 5 | ...do | 200 | 135 | 130 | | 45 | 50 |

[a] The effect of the monomeric amino bodies is included for purposes of comparison.

The compositions tested consisted of 10 parts paraffin wax, 90 parts cyclized rubber[b] and the addition materials set out in the tabulation. The regenerated cellulose test strips were exposed to a standard sun lamp for the time set out in the tabulation.

Table IV

| Stabilizer | Heat seal strength | | | | |
|---|---|---|---|---|---|
| | Original | Days of aging | | | |
| | | 21 | 28 | 35 | 42 |
| None (control) | 200 | 115 | 105 | 60 | 40 |
| Dimethyl amino ethyl methacrylate polymer | 200 | 150 | 150 | 150 | 150 |
| Phenol - formaldehyde - methylamine resin | 200 | 150 | 150 | 150 | 150 |
| Diphenyl guanidine - formaldehyde resin | 200 | 160 | 160 | 120 | 110 |
| Phenol-formaldehyde piperazine resin | 200 | 200 | 200 | 200 | 190 |

[b] The cyclized rubber used was the product resulting from milling the non-homogeneous material obtained by drowning the reaction mass before the initial exothermic preparation reaction had subsided. It had a deformation point of 30° C.

[c] The milled product having a softening point of 30° C., described in Table II.

The compositions tested consisted of 10 parts paraffin wax, 90 parts Marbon B[d] and 3 parts of addition material. The heat sealed regenerated cellulose test strips were aged at 95° F. (35° C.) for the time set out in the tabulation.

How the foregoing objects and related ends are accomplished will be apparent from the following exposition, in which are disclosed the principle and divers embodiments of the invention, including the best mode contemplated for carrying out the same. Parts are given by weight throughout the application, unless otherwise specified.

Example I

Prepare a moistureproofing coating composition (lacquer) by dissolving a mixture of 90 parts Pliolite (unmilled material softening at 30° C.), 10 parts paraffin wax (M. P. 60° C.) and 1 part dimethyl amino ethyl methacrylate polymer, in toluene. Pass a sheet of regenerated cellulose approximately 0.00088 inch thick through a bath of this composition, remove the excess solution from the surface by means of doctor knives, and introduce the coated sheet into a drier through which air is circulating. Raise the temperature rapidly and dry the coating at a temperature approximately equal to the melting point of the wax. The material so produced is highly trans-

[d] Practically pure cyclized rubber containing no chlorine or other impurity other than those normally present in rubber, and having a softening point of 50° C.

parent, flexible, and moistureproof, and exhibits no degradation of moistureproofness or heat seal properties after a period of 7 days from the time of coating.

*Example II*

Apply a moistureproofing coating composition consisting of:

| | Parts |
|---|---|
| Pliolite (softening point 30° C.) | 90 |
| Paraffin wax (M. P. 60° C.) | 10 |
| Dimethyl amino ethyl methacrylate polymer | 3 | to a regenerated cellulose sheet in the manner described in Example I. A product so produced is highly transparent, moistureproof, and exhibits good heat seal with no degradation in these properties after the elapse of a considerable period of time.

*Example III*

Apply a composition consisting of:

| | Parts |
|---|---|
| Pliolite (homogenized, softening point 30° C.) | 90 |
| Paraffin wax (M. P. 60° C.) | 10 |
| Dimethyl amino ethyl methacrylate polymer | 5 | to a sheet of regenerated cellulose in the manner described in Example I. Moistureproofed sheets so produced exhibit good heat seal with no degradation over a period of six weeks from the time of coating.

*Example IV*

Apply a composition consisting of:

| | Parts |
|---|---|
| Pliolite (homogenized, softening point 30° C.) | 90 |
| Paraffin wax (M. P. 60° C.) | 10 |
| Diethyl amino ethyl methacrylate polymer | 3 | to a sheet of regenerated cellulose as described in Example I. A product so produced is highly transparent, flexible and moistureproof, and shows no degradation in these properties after a period of six weeks. In addition, after a two weeks interval the coating remains firmly adhesive upon the base sheet and cannot be loosened by immersion in water for a period of one hour or longer.

*Example V*

Apply a composition consisting of:

| | Parts |
|---|---|
| Pliolite (homogenized, softening point 30° C.) | 90 |
| Paraffin wax (M. P. 60° C.) | 10 |
| Diethyl amino ethyl methacrylate polymer | 5 | to a sheet of regenerated cellulose as described in Example I. Correspondingly excellent results are obtained.

*Example VI*

Apply a composition consisting of:

| | Parts |
|---|---|
| Pliolite (homogenized, softening point 30° C.) | 90 |
| Paraffin wax (M. P. 60° C.) | 10 |
| Phenol formaldehyde methyl amine resin | 5 | to a sheet of regenerated cellulose, as described in Example I. Similar excellent results are obtained.

*Example VII*

Dissolve a composition consisting of:

| | Parts |
|---|---|
| Pliolite (homogenized, softening point 30° C.) | 90 |
| Paraffin wax (M. P. 60° C.) | 10 |
| Diphenyl guanidine formaldehyde resin | 2 | in toluene, and apply it to a regenerated cellulose sheet as described in Example I. Similar excellent results are obtained.

*Example VIII*

Dissolve a composition consisting of:

| | Parts |
|---|---|
| Pliolite (homogenized, softening point 30° C.) | 90 |
| Paraffin wax (M. P. 60° C.) | 10 |
| Phenol formaldehyde piperazine resin | 3 | in benzene and apply it to a regenerated cellulose sheet, as described in Example I. Similar excellent results are obtained.

*Example IX*

Apply a composition consisting of:

| | Parts |
|---|---|
| Pliolite (homogenized, softening point 30° C.) | 90 |
| Paraffin wax (M. P. 60° C.) | 10 |
| Triethanol amine phthalate resin | 3 | to a sheet of regenerated cellulose, in the manner described in Example I. Similar results are obtained.

*Example X*

Dissolve a composition consisting of:

| | Parts |
|---|---|
| Marbon B (softening point 50° C.) | 90 |
| Paraffin wax (M. P. 60° C.) | 10 |
| Dimethyl amino ethyl methacrylate polymer | 3 | in toluene, and apply it to a sheet of regenerated cellulose, as described in Example I. Similar excellent results are obtained.

*Example XI*

Dissolve a composition consisting of:

| | Parts |
|---|---|
| Marbon B (softening point 50° C.) | 90 |
| Paraffin wax (M. P. 60° C.) | 10 |
| Phenol formaldehyde methyl amine resin | 3 | in toluene, and apply it to a sheet of regenerated cellulose, as described in Example I. Similar excellent results are obtained.

*Example XII*

Dissolve a composition consisting of:

| | Parts |
|---|---|
| Marbon B (softening point 50° C.) | 90 |
| Paraffin wax (M. P. 60° C.) | 10 |
| Diphenyl guanidine formaldehyde resin | 3 | in toluene, and apply it to a sheet of regenerated cellulose as described in Example I. Similar excellent results were obtained.

*Example XIII*

Dissolve a composition consisting of:

| | Parts |
|---|---|
| Marbon B (softening point 50° C.) | 90 |
| Paraffin wax (M. P. 60° C.) | 10 |
| Phenol formaldehyde piperazine resin | 3 | in toluene, and apply it to a sheet of regenerated cellulose, as described in Example I. Similar results are obtained.

*Example XIV*

Dissolve a composition comprising essentially:

| | Parts |
|---|---|
| Pliolite (deformation point 65° C.) | 90 |
| Hydrogenated methyl abietate | 10 |
| Dimethyl amino ethyl methacrylate polymer | 3 | in toluene, and apply it to a surface of regenerated cellulose film. The coated film, although not moistureproof, will be highly flexible and transparent and exhibits good heat seal bond strength for long periods of time.

Example XV

A batch of cyclized rubber (a milled product having a deformation point of 27°–30° C.) and phenol formaldehyde methyl amine resin (prepared according to Example I of U. S. A. Patent No. 2,098,869) mixture was prepared. The proportions were:

| | Parts |
|---|---|
| Rubber condensation* derivative | 25 |
| Amino polymer | 6.2 |
| Toluene | 81.2 |

*The term "condensation" is used in the same sense that it is employed by Cohen (page 245 of his "Organic Chemistry for Advance Students," 1909 edition), namely: "Condensation may, then, be defined as the union of two or more organic molecules or parts of the same molecule with or without elimination of component elements, in which the new combination is effected between carbon atoms."

This composition was applied to paper, leather, waxed paper, metal foil (aluminum, tin and lead) regenerated cellulose sheet and low substituted cellulose ethers (methyl, ethyl, glycol and glycolic acid) by means of brushes, rollers and doctor knives. The deposited coatings were non-tacky, waterproof and flexible. When moistened with toluene or when subjected to heat and pressure, excellent adhesion to a variety of surfaces, including wood and those mentioned above, was obtained. The improvement (in the life of the bond) was 25-fold over the same composition omitting the amine polymer.

Example XVI

Twenty-five (25) parts of the cyclized rubber of Example XV and 6.2 parts of phenol formaldehyde methyl amine resin prepared according to Example I of U. S. A. Patent No. 2,098,869, were dissolved in 81.2 parts of toluene. Sulfite paper (35 pound type) was coated with 0.002 to 0.003 inch of the resulting composition. The coated paper was then aged at 65° C., and adhesive tests were made on samples at intervals of 3 to 5 days. It was 13 days before the coated paper no longer adhered tenaciously to waxed shot gun shell paper stock.

Example XVII

Prepare an adhesive composition containing cyclized rubber and amino polymer in the ratio of 80:20, by mixing 25 parts of Pliolite (softening point 30° C.) dissolved in 75 parts of toluene (with the aid of stirring), and 6.2 parts of poly-beta-dimethyl amino ethyl methacrylate dissolved in 6.2 parts of toluene. Stir the mixture until homogeneous before utilization.

Example XVIII

Prepare an adhesive composition containing cyclized rubber and amino polymer in the ratio of 80:20, by mixing 25 parts of Plioform (softening point 75° C.) dissolved in 75 parts of toluene (with the aid of stirring), and 6.2 parts of poly-beta-dimethyl amino ethyl methacrylate dissolved in 6.2 parts of toluene. Stir the mixture until homogeneous before utilization.

Example XIX

Prepare an adhesive composition containing cyclized rubber and amino polymer in the ratio of 80:20, by mixing 25 parts of Pliolite (softening point 30° C.) dissolved in 75 parts of toluene (with the aid of stirring), and 6.2 parts of resinous reaction product of phenol, formaldehyde, and methyl amine (prepared as described in Example I of U. S. A. Patent No. 2,098,869 to Harmon and Meigs), dissolved in 6.2 parts of toluene. Stir the mixture until homogeneous before utilization.

Example XX

Dissolve 50 parts of cyclized rubber (Pliolite having a distortion point of 30° C.) by stirring it in 150 parts of toluene. To the resultant add 2.6 parts of the resinous reaction product of phenol, formaldehyde, and methyl amine (prepared as described in Example I of U. S. A. Patent No. 2,098,869 to Harmon and Meigs) dissolved in 5 parts of toluene, and mix the two solutions until homogeneous to produce an adhesive composition.

Example XXI

Prepare an adhesive composition by dissolving 50 parts of cyclized rubber (Pliolite having a softening point of 30° C.) in 150 parts of toluene, with stirring. To this add 5.5 parts of the resinous reaction product of diphenyl guanidine formaldehyde and methylamine dissolved in 10 parts of toluene. Stir the mixture until homogeneous before using. The ration of cyclized rubber to amino polymer in this composition is 90:10.

The amino polymer is prepared by passing 31 parts (1 mol) of methyl amine into 160 parts (2 mols) of 37% formaldehyde solution cooled with ice. The resultant solution of dimethylol methyl amine (1 mol) is then added to 215 parts (1 mol) of diphenyl guanidine, and the mixture stirred for 15 minutes. This dough-like product is allowed to stand for 22 hours to complete the reaction. At the end of this time the mixture becomes a hard, resinous mass. It is ground under cold water, filtered, washed with water, and dried over calcium chloride in a vacuum dessicator to give a white powder soluble in acetone, ethyl acetate, chloroform, dioxan and toluene.

Example XXII

Prepare an adhesive composition by dissolving 50 parts of cyclized rubber (Pliolite having a softening point of 55° C.) in 150 parts of toluene, with stirring. To this add 5.5 parts of the Example XXI resinous reaction product of diphenyl guanidine formaldehyde and methylamine dissolved in 10 parts of toluene. Stir the mixture until homogeneous before using. The ratio of cyclized rubber to amino polymer in this composition is 90:10.

Example XXIII

Prepare an adhesive composition by dissolving 50 parts of cyclized rubber (Pliolite having a softening point of 65° C.) in 150 parts of toluene, with stirring. To this add 5.5 parts of the Example XXI resinous reaction product of diphenyl guanidine formaldehyde and methylamine dissolved in 10 parts of toluene. Stir the mixture until homogeneous before using. The ratio of cyclized rubber to amino polymer in this composition is 90:10.

Example XXIV

Prepare an adhesive composition by dissolving 50 parts of cyclized rubber (Plioform having a softening point of 105° C.) in 150 parts of toluene, with stirring. To this add 5.5 parts of the Example XXI resinous reaction product of diphenyl guanidine formaldehyde and methylamine dissolved in 10 parts of toluene. Stir the mixture until homogeneous before using. The ratio of cyclized rubber to amino polymer in this composition is 90:10.

Example XXV

Prepare an adhesive composition by dissolving 40 parts of cyclized rubber (Pliolite having a softening point of 30° C.) in 120 parts of toluene, with stirring. To this add 10 parts of triethanolamine phthalate polymer dissolved in 90 parts of dioxan. Stir the mixture until homogeneous before using. The ratio of cyclized rubber to the basic resin of the composition is 80:20.

The details of the preparation of this amino polymer are described in under group G of U. S. A. Patent No. 2,300,367 to Harmon.

Example XXVI

Prepare an adhesive composition by dissolving 50 parts of cyclized rubber (Pliolite having a softening point of 30° C.) in 150 parts of toluene, with stirring. To this add 2.6 parts of diphenyl guanidine formaldehyde resin (prepared as described under group E of Harmon U. S. P. 2,300,367) dissolved in 5 parts of toluene, and the two solutions stirred until homogeneous. The ratio of the cyclized rubber to amine resin in this composition is 95:5.

Example XXVII

Prepare an adhesive composition by dissolving 8 parts of cyclized rubber (Pliolite having a softening point of 30° C.) in 24 parts of toluene, with stirring. To this add 2 parts of n-butyl-diethanolamine dimethylol urea dimethyl ether resin (prepared as described under group K of Harmon U. S. P. 2,300,367) dissolved in 20 parts of dioxan.

Example XXVIII

Prepare an adhesive composition by dispersing 16 parts of cyclized rubber (Pliolite having a softening point of 30° C.) and 4 parts of dimethylol urea dimethyl ether-hexamethylene diamine resin (prepared as described under group K of Harmon U. S. P. 2,300,367) in 83 parts of toluene. This is accomplished by ball milling for 18 hours. The ratio of cyclized rubber to resin is 4:1.

Example XXIX

Dissolve a pressure sensitive adhesive composition consisting of:

| | Parts |
|---|---|
| Cyclized rubber (Pliolite having a softening point of 30° C.) | 45 |
| Chlorinated diphenyl (62% chlorine) | 40 |
| Heavy mineral oil | 5 |
| Diethylaminoethyl methacrylate polymer | 10 | in benzene (or toluene), apply the resultant to a surface, and allow the solvent to evaporate.

Example XXX

Dissolve a pressure sensitive adhesive composition consisting of:

| | Parts |
|---|---|
| Cyclized rubber (Marbon B having a softening point of 50° C.) | 20 |
| Rosin | 18 |
| Chlorinated paraffin (35% chlorine) | 10 |
| Phenol-formaldehyde-piperazine resin | 5 | in benzene (or toluene), apply the resultant to a surface, and allow the solvent to evaporate.

Example XXXI

Dissolve a highly moistureproof adhesive composition consisting of:

| | Parts |
|---|---|
| Cyclized rubber (Pliolite having a softening point of 30° C.) | 50 |
| Hydrogenated methyl abietate | 30 |
| Paraffin wax (60° C. M. P.) | 20 |
| Dicyclohexylaminoethyl methacrylate polymer | 10 | in benzene (or toluene), apply the resultant to a surface, and allow the solvent to evaporate.

Example XXXII

Dissolve a tacky adhesive composition consisting of:

| | Parts |
|---|---|
| Cyclized rubber (pliolite having a softening point of 60° C.) | 10 |
| Pale crepe rubber | 5 |
| Hydrogenated rosin | 15 |
| Methyl abietate | 10 |
| Mineral oil | 5 |
| Phenol-formaldehyde-methyl amine resin | 5 | in benzene (or toluene), apply the resultant to a surface, and allow the solvent to evaporate.

Example XXXIII

Dissolve a tacky adhesive composition consisting of:

| | Parts |
|---|---|
| Cyclized rubber (Pliolite having a softening point of 30° C.) | 50 |
| Polymerized isobutylene (liquid) | 50 |
| Dimethylaminoethyl methacrylate polymer | 10 | in benzene (or toluene), apply the resultant to a surface, and allow the solvent to evaporate.

In utilizing the adhesive compositions, solutions are prepared according to the directions set out in the examples, and applied to a suitable backing (regenerated cellulose, coated regenerated cellulose, paper, leather, metal foil, and similar materials) by means of a brush, roller, doctor knife, etc., after which the solvent is allowed to evaporate. The deposited films are waterproof and flexible. They may or may not be adhesive in the dry condition and at ordinary temperatures. When moistened with hydrocarbon solvents such as toluene, or when subjected to heat and pressure, they have excellent adhesion to a wide variety of surfaces, including regenerated cellulose sheet, paper, metal foil, leather, wood, and the like. The adhesive films and bonds retain their heat sealing and adhesive properties for long periods of time.

The cyclized rubber may be prepared in any one of several different ways as disclosed, for example, in Mitchell U. S. P. 2,321,764, and its composition and properties may vary somewhat, but however prepared, it is thermoplastic and less unsaturated than rubber. It appears to have an empirical formula $(C_5H_8)_x$ and to be a condensation derivative of rubber.

Condensation derivatives with a softening point from 50° to 140° C. are, in general, satisfactory for use in adhesives, lacquers, and the like. A product with a softening point around 70° C. is ordinarily employed. Obviously, the most satisfactory softening point for any particular use depends upon the nature of the use.

The cyclized rubber called "Pliolite," mentioned in several of the examples, is a thermoplastic rubber derivative made by condensing rubber with a catalyst of the tin tetrachloride type. Specific details of its preparation, structure, etc., are set forth in the Paper Trade Journal, page 96, February 23, 1939, Rubber Age, April 1939, and J. I. E. C. XIX 1033, XXVI 125 and XXXIII 389. Details are also disclosed in U. S. A. Patents No. 1,797,188, 1,846,247, 1,853,334 and 2,052,931.

The amino-nitrogen-containing polymers capable of being formed into coherent films, soluble in organic solvents and in 2% aqueous acetic acid and insoluble in water which are suitable for purposes of this invention are those of groups A to Q inclusive disclosed in pp. 4, 5 and 6 of Harmon U. S. P. 2,300,367.

Instead of simple polymers, interpolymers may be prepared, for instance, by reacting methyl methacrylate and methyl vinyl ketone in the presence of ammonium hydroxide or reacting beta-di-cyclohexylaminoethyl methacrylate monomer and beta-dimethylaminoethyl methacrylate monomer together under suitable conditions, or reacting dicyclohexylaminoethyl methacrylate with methyl vinyl ketone under suitable conditions. Other equivalent polymeric materials, such as copolymers, may also be used, provided their solubility characteristics are as previously set forth.

The two classes of basic amino-nitrogen-containing polymers which have given the most satisfactory results are the polymeric amino-alcohol esters of alpha-substituted acrylic acids described in U. S. A. Patents 2,138,762 (Harmon) and 2,138,763 (Graves), and the resins obtained by reacting phenols, formaldehyde and amines described in U. S. A. Patent No. 2,098,869 (Harmon and Meigs).

The latter products, which are dilute acetic acid soluble resins, and with which may be classed the very satisfactory phenol formaldehyde piperazine resins, are obtained by reacting a phenol containing carbon, hydrogen and oxygen only, and having at least 2 unsubstituted nuclear positions ortho or para to the phenolic hydroxyl with formaldehyde and a non-aromatic primary amine containing less than 7 carbon atoms. A molecular ratio of amine to phenol of not less than 0.5:1 and not greater than 1:1, and a molecular ratio of aldehyde to amine not greater than 1:1 in this reaction, give especially desirable results.

The specific compounds which are preferred for the purposes of this invention, are beta-di-n-butylaminoethyl methacrylate polymer; 2-amino-cyclohexyl methacrylate polymer; triethanolamine mono-methacrylate polymer; 2-(diethylamino)-cyclohexyl methacrylate polymer; 4-(beta-methacrylyloxyethyl) morpholine polymer; beta-di-methylaminoethyl methcrylate polymer; beta-diethylaminoethyl acrylate polymer; beta-dicyclohexylaminoethyl acrylate polymer; 1-(beta-methacrylyloxyethyl) piperidine polymer; the resin obtained by the hydrogenation, in the presence of ammonia, of polymerized bis-(4-ketocyclohexyl) dimethylmethane; the resin obtained from the hydrogenation in the presence of ammonia, of polymerized methyl vinyl ketone; the reaction product of polymeric methyl alpha-methylvinyl ketone and cyclohexylamine; the reaction products of polymeric methylvinyl ketone and aqueous ammonia (or cyclohexylamine, ethylenediamine, hexamethylenediamine, and the like); the resin obtained by reacting cyclohexanone with formaldehyde and methylamine; the resinous reaction product of acetone with formaldehyde and butylamine; and phenol-formaldehyde-hydrazine resin, cresol-formaldehyde-tetraethylenepentamine resin, phenol-formaldehyde-ethylenediamine resin, phenol-formaldehyde-dodecyl amine resin, phenol-formaldehyde-thiourea resin and cresol-formaldehyde-melamine resin.

The polymeric basic amino nitrogen-containing substance may be introduced into the cyclized rubber, and compositions containing the same, in any desired manner. Ordinarily the incorporation is made by the use of a mutual solvent or by milling, but grinding, kneading, and other conventional mixing procedures are satisfactory.

The choice of amino polymer to be used depends partly upon the solubility of the polymer, partly on the compatibility of the polymer with the cyclized rubber in solution, and partly on the special requirements of the specific composition (adhesive, moistureproofing lacquer, etc.) being manufactured, such as softening point, degree of surface tack, etc. In general, basic resins soluble in toluene or gasoline, compatible with cyclized rubber in solution and capable of imparting the longest possible storage life to the cyclized rubber after the application, are preferred. One criterion of stabilizing power is the basicity of the resin as judged by the per cent of amino nitrogen in the molecule. Usually the higher the percentage of amino nitrogen the longer will be the stabilizing power of the polymer.

The stabilizing effect of the amino polymer is roughly proportional to the amount used with the cyclized rubber. The practical limits are from 0.005 to 1.0 part of amino polymer per part of cyclized rubber product. The improvement obtained by using amounts of amino polymer below the aforementioned lower limit is detectable, but not great enough to be of practical value.

Variations in the proportions of the other ingredients of the stabilized composition are permissible.

In adhesive compositions, the most satisfactory results have been obtained when the amount of the amino polymer used equalled 0.5 to 50.0% of the cyclized rubber. In moistureproofing coating compositions, the most satisfactory results have been obtained when the amount of amino polymer was 0.5% to 30%, and preferably 1.0% to 10% of the cyclized rubber.

The moistureproofing coating ordinarily employed is a continuous unbroken layer comprising essentially moistureproofing material (material which does not dissolve more than an infinitesimal amount of, if any, water), for example, a waxy (wax-like) substance such as high melting paraffin wax and organic solvent soluble coherent (self-sustaining) cementing (binding, film forming) material therefor, for example, the cyclized rubber alone or the cyclized rubber containing minor proportions of previously known moistureproofing coating composition film formers. Generally the base film contains softening material, for example, glycerol, and the coating contains plasticizing material, for example dibutyl phthalate, to increase flexibility.

To overcome any haziness which might result from some proportions and combinations of other components of the coating, transparentizing (blending, homogenizing) material, for example, resins and gums such as dammar and ester gum, is ordinarily included.

Other auxiliary ingredients are known to the moistureproofing art.

Moistureproofing coating compositions may be converted into self-sustaining films having the solids composition set forth, by procedures well known in the art, and may be coated on non-fibrous surfaces other than regenerated cellulose, for example, albuminous material such as casein, gelatine, etc., organic solvent soluble materials such as ethyl cellulose, cellulose acetate, etc., waxed surfaces of shot shell waxed cardboard, and the like.

The adhesive compositions may be applied as solutions (used in a broad sense to include both true solutions and pseudo-solutions, which latter are in reality colloidal suspensions) or melts without any solvent, or melts with reduced amounts of solvent.

Although base sheets may be similarly coated with the moistureproofing compositions, in the preferred procedures the moistureproofing coating compositions are applied by passing the base sheet through a bath (solution) containing the coating, or by spraying the coating solution on the base.

In forming solutions of the cyclized rubber-amino polymer compositions, aliphatic, aromatic and chlorinated hydrocarbons are suitable. The preferred substances are benzene, toluene, xylene, tetrachlorethane, kerosene, and related products. Adhesive materials may be prepared by emulsifying a hydrocarbon solution of the adhesive composition in water containing a wetting agent, that is, a material which decreases the surface tension between the hydrocarbon solution and the water. Although a variety of wetting agents may be used, the water soluble salts of alkyl sulfates, in which the alkyl group contains more than 7 carbon atoms, are preferred. Certain organic liquids (solvents) such as acetone, dimethyl formamide and ethylene glycol monomethyl ether, may be used for the same purpose. The presence of the ethylene glycol monomethyl ether and dimethyl formamide are particularly desirable in adhesives for moistureproofed regenerated cellulose sheet wrapping material when the presence of a solvent capable of softening the moistureproofing coating is desired.

In preparing the adhesive compositions, resins (natural, synthetic and semi-synthetic) may be incorporated as adjuvants or augmenting agents. The preferred materials of this character include rosin, hydrogenated rosin, hydrogenated rosin derivatives, ester gum, pitches, cumarone indene resins, alkyd (polyhydric alcohol-polycarboxylic acid reaction product) resins, dammar, and the like. Such materials compound readily with the cyclized rubber. It will be understood that it is not always desirable to have a resin present. When the presence of resins is desirable, one or more may be used.

Plasticizers (sometimes improperly referred to as softeners) may also be incorporated in the adhesive compositions when desired. The preferred materials of this type are dibutyl phthalate, dicresyl phosphate, chlorinated paraffin, dixylyl ethane, chlorinated diphenyls, hydrogenated methyl abietate, di-ethyl-toluene sulfonamide, camphor, hydrocarbon oils, and the like. One or more of material of this character may be present in the adhesive composition, or material of this character may be omitted.

In case it is desired to change the appearance of the stabilized cyclized rubber composition, dyes and/or pigments may be incorporated.

Waxes, as well as natural and synthetic resins, etc., may be added to enhance the adhesive and other characteristics of the cyclized rubber compositions. One or more waxes (used generically to include waxy substances like paraffin wax, as well as true waxes which are monohydric alcohol esters of higher fatty acids) may be employed, as desired.

For adhesive compositions containing 100 parts of cyclized rubber product, 0 to 75 parts of transparentizing material (preferably 10 to 40 parts) and 0 to 75 parts of plasticizing material (preferably 10 to 40 parts) are satisfactory. In moistureproofing coating compositions containing 100 parts of cyclized rubber product, 0 to 25 (preferably 0 to 10) parts of plasticizing material and 0 to 50 (preferably 0 to 25) parts of transparentizing material, are employed. Such proportions can be applied as melts or solutions.

Various methods of measuring the stabilizing effect of the amino polymer are possible. The heat seal bond strength appears to be the simplest and most satisfactory, both in normal use and in accelerated tests.

In the past great difficulty has been encountered in sealing regenerated cellulose and like sheet material, particularly the moistureproofed varieties. Vast research programs and unbelievable expenditures in testing show that the materials commonly accepted as adhesives were useless in this field. To date only a few materials which will accomplish this purpose at all satisfactorily, have been discovered, and these materials seem to bear no chemical or physical relation to each other. In the formation of envelopes, bags and various other articles from the moistureproofed sheet materials, it is necessary, in order to preserve the moistureproofness, that a good uniform adhesive contact be secured between the different portions of the article in its fabrication. This adhesive contact must be secured without destroying the moistureproof characteristics or substantially impairing the transparency at the place of adhesion. Ordinarily it is also essential that the adhesive should not penetrate into the interior of the sheet to such an extent that it renders the coating on the opposite side of the sheet tacky, because if it does, it may impair the moistureproof qualities of the article, and in addition cause it to stick to other articles with which it may come into contact.

The present discovery affords an excellent solution of the aforementioned problem. The thermoplastic adhesive compositions of this invention are suitable for sealing smooth (glass-like), non-porous, non-fibrous cellulosic sheets and films (such as those of regenerated cellulose) whether they have a moisture-proofing coating composition or not. These compositions are also eminently suited for producing permanently tacky pressure-sensitive adhesive tapes or anchoring other adhesives in the formation of permanently tacky pressure-sensitive adhesive tapes and masking material when coated upon bases such as regenerated cellulose film.

The adhesive compositions of this invention have an application which is broader than the sealing of regenerated cellulose sheet material and moisture-proofed regenerated cellulose sheet material. For example, the adhesives are applicable to articles formed of or containing cellulose acetate or cellulose nitrate, to plastics, to artificial leather, to photographic films, to novelties, and the like. The adhesives are also capable of use in joining various materials, such as paper, cardboard, cloth, metal foils, metal sheets and the like to regenerated cellulose and cellulose derivative surfaces. The adhesives of this invention are eminently suited for laminating purposes.

The adhesive compositions are particularly useful in the field of pressure-sensitive adhesives. As anchoring agents they effect a more secure bond between a pressure-sensitive adhesive of the "Scotch tape" type and regenerated cellulose film base. This application of the present invention is one of the most promising so far discovered. The Scotch tape (a recently developed product) ordinarily comprises a ribbon or tape of transparent or translucent regenerated cellulose having on the surface thereof a permanently tacky pressure-sensitive adhesive. The uses of such a material are almost unlimited, although the employment as masking material and joining tape probably constitutes the largest volume of use. These and many other uses of the material involve repeated application and removal of the adhesive tape from the surface.

For such a purpose it is highly desirable that the adhesive material adhere firmly to the base sheet, and in particular that it adhere more firmly to the base sheet than to the surface to which such a tape is applied. The anchoring effect of the compositions of this invention are especially notable in this respect. When the anchoring compositions of the present invention are employed, the adhesive material can be completely removed from the surface to which the tape has been applied, with the result that economies such as re-use of the tape and avoidance of cleaning the surface where the tape was applied, are possible. When such tapes are stripped from the surfaces to which they have been adhered, there remains a comparatively clean surface free from tackiness. The adhesive may be applied to the regenerated cellulose ribbon in the conventional manner.

The thickness of the adhesive layer in the Scotch tape type product usually falls within the range of 0.001 to 0.01 of an inch. Thicker layers may, of course, be used for special purposes.

By the expressions "pressure sensitive adhesive" and "normally pressure sensitive adhesive" is meant a material which can be caused to adhere to smooth regenerated cellulose sheet by pressure alone at ordinary normal room temperatures. Slight pressures, such as might be exerted by means of a thumb or finger, are contemplated in this definition.

By way of comparison, the adhesion to smooth surfaces obtained with the cyclized rubber compositions of this invention is greatly superior to that obtained with rubber, rubber derivatives such as chlorinated rubbers, synthetic rubbers and their derivatives.

Many of the advantages of the present invention are believed apparent from the foregoing part of the specification. The cyclized rubber is stabilized for long periods of time, if not indefinitely, and as a result the compositions containing the same have their useful life extended many times over, even under conditions involving high temperatures and/or strong light.

The degree of stability resulting from the incorporation of the polymeric or resinous basic amino nitrogen-containing bodies in cyclized rubber is much greater than can be obtained by incorporating conventional anti-oxidants. The amino polymers being film forming by nature and having thermoplastic properties, have the further advantage that they contribute to the adhesive properties of the cyclized rubber. In an actual case it has been found that a 25-fold improvement in 65° C. ageing life for cyclized rubber containing the amino polymers as compared with the unmodified cyclized rubber, was obtained. About a 5-fold improvement is all that can be expected when anti-oxidants such as those used in rubber are employed.

The adhesive compositions adhere firmly to smooth glass-like surfaces such as those of regenerated cellulose and like non-fibrous sheet material, even when the surface has a moistureproof coating. Their adhesive properties, particularly the length of time during which the adhesive composition is effective, are greatly improved, both in the thermoplastic and pressure-sensitive types.

In the moistureproofing coating composition field the results are even more striking. The moistureproofing compositions adhere tenaciously to regenerated cellulose and like surfaces over long periods of time, even in the presence of liquid water or under conditions of high relative humidity, and the characteristics of the heat seal bonds (particularly strength) are outstanding. Furthermore, by virtue of their ingredients, such coating compositions are cheaper and more economical than many of those used heretofore extensively. In addition, sheet material having good slip (surface characteristics enabling adjacent sheets in a stack to separate from each other), a desideratum in material for use on automatic machinery, are obtained. The transparency properties are good even in thick coatings.

Moistureproofness, moistureproofing and moistureproof materials and expressions are defined in U. S. A. Patent No. 2,147,180 (Ubben). In the interest of brevity the definitions are not repeated here. The terms and expressions related thereto and employed herein are used in accordance with such definitions.

Adhesive compositions comprising primarily the stabilized cyclized rubber of this invention, can be used advantageously in the sealing of the closures of shotshells. The bond to the waxed surface (paper) remains firm at the temperatures up to 120° F. (49° C.) which are reached in rapid firing, and no deposit or residue remains which accumulates in the gun barrel.

So far as is known, no organic polymeric basic material of this type has been suggested before for the present purpose. In addition to arresting the deterioration of the cyclized rubber system or composition for longer periods of time, amino polymers of this class have the additional advantage of adding to the film-forming or plastic characteristics of the composition in question. By "film-forming" is meant the capability of being formed into a coherent, solid film, dry to the touch.

Some discussion of the meaning and significance of the above restrictions on the stabilizing materials may be desirable. The term "polymeric" implies an amorphous, high molecular weight substance usually capable of being formed into a coherent film; if the agent be polymeric, non-volatile and film-forming it is retained in the film for appreciably longer times and does not detract from the film-forming ability of the composition. By "basic" is meant an ability to form acid addition salts, and by "amino-nitrogen"

is meant the nitrogen of an amino group as opposed to that of nitro, amido, nitrile, etc., groups. It is a matter of simple test to determine if the agent is basic in character and contains amino-nitrogen. In the large majority of cases, the materials from which the agent is synthesized are a definite indication whether or not it contains amino-nitrogen. It is sufficiently basic if it dissolves readily in dilute aqueous acetic acid. The qualification "organic-solvent-soluble" implies simple physical solution (i. e., without chemical reaction) to an appreciable extent in one or more types of solvents such as alcohols, hydrocarbons, ketones, esters, etc. Thus, methylaminophenol-formaldehyde resin, which is readily soluble in a number of solvents, is suitable for use in the invention, whereas deacetylated chitin is not because it is insoluble in organic solvents.

As many apparently widely different embodiments of this invention may be made without departing from the spirit and scope thereof, it is to be understood that this invention is not limited to the specific embodiments thereof except as defined in the appended claims.

I claim:

1. Sheet material coated with cyclized rubber containing a minor proportion of amino polymer insoluble in water and soluble in organic solvents and 2% acetic acid.

2. As a new composition of matter, cyclized rubber containing a minor proportion of basic amino polymer capable of being formed into coherent solid films which are substantially insoluble in water and 5% aqueous ammonia and soluble in 2% aqueous acetic acid and organic solvents.

3. Cyclized rubber compounded with 0.5%–50% of non-volatile, coherent, self-sustaining, film-forming, polymeric, organic, halogen-free, basic amino-nitrogen containing substance capable of being formed into coherent solid films which are substantially insoluble in water and 5% aqueous ammonia and soluble in 2% aqueous acetic acid and organic solvents 4. A composition comprising essentially cyclized rubber and polymeric phenol-formaldehyde-methyl-amine resin capable of being formed into coherent solid films which are substantially insoluble in water and 5% aqueous ammonia and soluble in 2% aqueous acetic acid and organic solvents, the amine polymer being present in an amount within the range 0.5% to 50% of the cyclized rubber.

5. As a new composition of matter, cyclized rubber having a deformation point in the range 30°–105° C. compounded with a minor proportion of resinous highly polymeric basic amino-nitrogen-containing compound capable of being formed into coherent solid films which are substantially insoluble in water and 5% aqueous ammonia and soluble in 2% aqueous acetic acid and organic solvents.

6. As a new composition of matter, rubber cyclized with tin tetrachloride containing a minor proportion of basic amino polymer capable of being formed into coherent solid films which are substantially insoluble in water and 5% aqueous ammonia and soluble in 2% aqueous acetic acid and organic solvents.

7. A thin, flexible sheet material comprising a film of a moistureproof composition, said moistureproof composition comprising essentially 3%–50% wax and cementing material therefor, said cementing material being cyclized rubber in which is incorporated 0.5% to 50% (based on the cyclized rubber) of basic amino polymer capable of being formed into coherent solid films which are substantially insoluble in water and 5% aqueous ammonia and soluble in 2% aqueous acetic acid and organic solvents.

8. A thin, flexible sheet material comprising a film of a moistureproof composition, said moistureproof composition comprising essentially 3%–50% wax and cementing material therefor, said cementing material being cyclized rubber in which is incorporated 3% to 15% (based on the cyclized rubber) of basic amino polymer capable of being formed into coherent solid films which are substantially insoluble in water and 5% aqueous ammonia and soluble in 2% aqueous acetic acid and organic solvents.

9. A moistureproofing lacquer comprising essentially 12% solids and an organic solvent therefor, said solids comprising essentially 3% to 50% moistureproofing wax and cyclized rubber containing 0.5% to 50% of basic amino polymer capable of being formed into coherent solid films which are substantially insoluble in water and 5% aqueous ammonia and soluble in 2% aqueous acetic acid and organic solvents.

10. The process of lengthening the effectiveness of moistureproofing coatings containing cyclized rubber, which comprises incorporating therein basic amino polymer capable of being formed into coherent solid films which are substantially insoluble in water and 5% aqueous ammonia and soluble in 2% aqueous acetic acid and organic solvents.

11. An article of manufacture comprising a base formed of a sheet of flexible, non-moistureproof, non-fibrous and transparent material coated with a composition comprising a coherent, self-sustaining, film-forming substance and a moistureproofing wax in proportions and of a thickness to produce a transparent moistureproof product, said film-forming substance being cyclized rubber and basic amino polymer capable of being formed into coherent solid films which are substantially insoluble in water and 5% aqueous ammonia and soluble in 2% aqueous acetic acid and organic solvents.

12. A moistureproofing coating composition comprising essentially wax, cyclized rubber and basic amino polymer capable of being formed into coherent solid films which are substantially insoluble in water and 5% aqueous ammonia and soluble in 2% aqueous acetic acid and organic solvents.

13. An article of manufacture suitable for use as a sheet wrapping material, comprising a base sheet or film of transparent regenerated cellulose having a transparent, moistureproof and flexible coating on each side thereof, the total thickness of the coatings on both sides being from 0.00001 to 0.00015 of an inch, each of said coatings comprising essentially a cementing agent of cyclized rubber and a basic amino polymer capable of being formed into coherent solid films which are substantially insoluble in water and 5% aqueous ammonia and soluble in 2% aqueous acetic acid and organic solvents.

14. A sheet wrapping material comprising a regenerated cellulose base film and a moistureproofing coating, said moistureproofing coating comprising essentially cyclized rubber having a deformation point of about 30° C. and a minor proportion of a film-former of basic amino polymer capable of being formed into coherent solid films which are substantially insoluble in water and 5% aqueous ammonia and soluble in 2% aqueous acetic acid and organic solvents, paraffin wax moistureproofing agent, blending agent and plasticizer.

15. The method of extending the useful life of moisture-resistant regenerated cellulose film comprising a coating embodying cyclized rubber cementing agent, which comprises diluting said cyclized rubber with basic amino polymer capable of being formed into coherent solid films which are substantially insoluble in water and 5% aqueous ammonia and soluble in 2% aqueous acetic acid and organic solvents.

WILLIAM HALE CHARCH.

CERTIFICATE OF CORRECTION.

Patent No. 2,350,385. June 6, 1944.

WILLIAM HALE CHARCH.

It is hereby certified that error appears in the printed specification of the above numbered patent requiring correction as follows: Page 4, second column, line 23, for the word "ration" read --ratio--; page 5, second column, line 64, for "$(C_6H_8)_x$" read --$(C_5H_8)_x$--; page 7, first column, line 66, for "dicresyl" read --tricresyl--; and second column, line 72, for "contaiing" read --containing--; page 8, first column, line 32, for "adhesiive" read --adhesive--; and that the said Letters Patent should be read with this correction therein that the same may conform to the record of the case in the Patent Office.

Signed and sealed this 8th day of August, A. D. 1944.

Leslie Frazer (Seal)

Acting Commissioner of Patents.